United States Patent [19]
Coffey

[11] 3,980,600
[45] Sept. 14, 1976

[54] PROCESS FOR REMOVING RESIDUAL MERCAPTAN FROM HIGH NITRILE POLYMERS

[75] Inventor: Gerald P. Coffey, Cleveland Heights, Ohio

[73] Assignee: Standard Oil Company, Cleveland, Ohio

[22] Filed: Sept. 20, 1974

[21] Appl. No.: 504,463

[52] U.S. Cl. .................. 260/29.6 AN; 260/879; 260/880 R; 526/23; 526/26; 528/489
[51] Int. Cl.² .................................. C08F 220/44
[58] Field of Search............ 260/29.6 AN, 29.6 AB, 260/29.6 AQ, 88.7 B, 85.5 S

[56] References Cited
UNITED STATES PATENTS

| | | | |
|---|---|---|---|
| 2,605,256 | 7/1952 | Conard | 260/85.5 N |
| 2,621,170 | 12/1952 | Banes | 260/85.5 N |
| 2,787,561 | 4/1957 | Sanders | 260/29.6 AN |
| 2,787,603 | 4/1957 | Sanders | 260/29.6 AN |
| 3,127,233 | 3/1964 | Lowes | 260/88.7 B |
| 3,306,955 | 2/1967 | Lowes | 260/29.6 AB |
| 3,756,976 | 9/1973 | Uraneck | 260/29.7 SQ |
| 3,817,888 | 6/1974 | Johnson | 260/23.7 N |

*Primary Examiner*—Paul R. Michl
*Attorney, Agent, or Firm*—John F. Jones; Sherman J. Kemmer; Evelyn R. Kosman

[57] ABSTRACT

This invention relates to a process for removing residual mercaptan from latices of high nitrile polymers which contain some unreacted nitrile monomer, by adjusting the pH of the latex to preferably from about 9 to 10.5 with an aqueous solution of hydroxide ions.

2 Claims, No Drawings

PROCESS FOR REMOVING RESIDUAL MERCAPTAN FROM HIGH NITRILE POLYMERS

The present invention relates to a process for the removal of residual mercaptan from latices of high nitrile polymers. More particularly this invention relates to a rapid method for the quantitative removal of residual mercaptan from the latices of polymeric compositions comprising copolymers and rubber-modified copolymers of olefinically unsaturated nitrile monomers, and wherein said process involves adjusting the pH of the latex of these polymers to a level of from about 9.0 to 10.5 with an aqueous solution of hydroxide ions.

The polymers of this invention are impermeable polymeric compositions particularly useful in the food packaging industry. Up to the present time the general practice has been to employ various types of mercaptans as chain transfer agents (molecular weight modifiers) in the preparation of these resins. This practice has resulted in a potential residual odor and taste problem in the resin. The removal of the offensive residual mercaptan from the resin by conventional stripping techniques has been found to be impractical in a commercial plant operation due to problems associated with containment of the mercaptan, and the need for thorough stripping of the latex to eliminate the emanation of mercaptan odors from pelletized resins on storing. Additionally, there is evidence which sugests that prolonged stripping has an adverse effect on the physical properties of the resin, particularly on color.

Heretofore, mercaptan removal from polymers has followed two main routes, namely; stripping, as indicated above, and oxidation. Treatment of mercaptan-containing polymers with oxidizing agents and chemicals, as disclosed in U.S. Pat. Nos. 3,756,976 and 3,817,888, as a means for destroying unreacted mercaptan in polymers of the type described in the present invention requires critical selection of the oxidizing agent because of the susceptibility of the residual unsaturation in the elastomer of the polymer to oxidation. Therefore, the need for a more practical process for mercaptan removal from such resins without adversely affecting the properties of the resin or the latex stability is readily apparent.

The process described in the present invention not only meets all of the requirements for such a process, but unexpectedly the present process also results in an improvement in the color stability of the treated resin.

In accordance with the process of this invention, essentially quantitative removal of residual mercaptan is accomplished by adjusting the pH of the polymer latex to a level of about 9 to 10.5 with a dilute aqueous solution of a base, and agitating the latex-aqueous mixture for a period of from about 1 minute to about 4 hours at a temperature ranging from about 15° to about 75°C. More preferably the contacting is continued at a pH from about 9 to 10.5 for a period of 20 to 60 minutes at a temperature of from about 20° to 60°C. The treated polymer latex is subsequently processed in the usual manner without having observed any adverse effect on the stability or physical properties of the resin.

Although some advantage is to be gained in carrying out the process within a pH range from about 7.5 to about 11.5, mercaptan consumption at a pH level of 7.5 is not quantitative and there is no apparent advantage in going to a pH much higher than 11.5 in terms of rate of mercaptan consumption, particularly in view of the tendency toward hydrolysis of the monomer or the resin at the higher pH levels.

The mechanism by which the consuming reaction of the mercaptan proceeds in this process is not definitely known, but it appears that a rapid and quantitative cyanoethylation reaction occurs in the presence of the hydroxide ions between the unreacted mercaptan and the unreacted nitrile monomer of the resin, as shown by the following generalized equation:

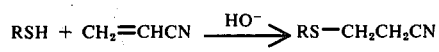

The improvement in color stability observed in the treated resin suggests that the cyanoethylated mercaptan believed to be formed apparently functions as a color stabilizer in the resin. This process is therefore suited to resin systems in which some unreacted olefinic nitrile monomer is present.

The process of this invention is applicable to the removal of mercaptans having a wide range of chemical structures, and may be advantageously applied to latices containing unreacted monosulfhydryl as well as multisulfhydryl mercaptans containing from 1 to about 18 carbon atoms.

The optimum reaction conditions for this process, within the ranges specified, are dependent to some extent on the chemical nature and molecular weight of the paticular mercaptan being removed. For example, latices containing mercaptans of lower molecular weight and greater acidity, may be treated at a lower pH level than those containing mercaptans of higher molecular weight and lower acidity. Further, it may be more advantageous to employ higher temperatures and longer treating times with latices of graft polymers containing higher percentages of rubber in order to maximize the monomer extraction of the mercaptan from the rubber, providing the acrylonitrile-mercaptan adduct is stable at the higher temperature. Generally, however, essentially quantitative removal of unreacted mercaptan is obtained in about 30 minutes at room temperature at a pH of about 10.

The source of hydroxide ions in the process may be any base that can achieve a pH of 9 to 10.5 in the polymer mixture and which will promote the cyanoethylation reaction. Most preferred, however, for economic reasons and ready availability are the hydroxides of the metals in Groups IA, IB, IIA and IIB of the Periodic Table. The pH of the latex is advantageously adjusted with an aqueous solution of the base in concentrations ranging from about 0.5% to 5.0% and more preferably in concentrations ranging from about 1.0% to 2.0% by weight. Too great an excess of base may have a deleterious effect on the physical properties of the polymer and the emulsion stability as well. Once the threshold hydroxide ion concentration is achieved in the latex, and this depends on the acidity of the particular mercaptan involved, the reaction is catalytic with respect to the hydoxide ion, and essentially no further consumption of hydroxide ion takes place. Although in some instances at elevated temperatures very minor amounts of hydroxide ion may continue to be consumed.

The polymer compositions contemplated to be within the scope of this invention are copolymers of an olefinically unsaturated nitrile monomer and another monovinyl monomer copolymerizable therewith which includes one or more of the vinyl aromatic monomers, esters of olefinically unsaturated carboxylic acids, vinyl esters, vinyl ethers, alpha-olefins and others. Preferably the polymer compositions of this invention are copolymers of the unsaturated nitrile and a vinyl aromatic monomer, copolymers of the unsaturated nitrile and an ester of an olefinically unsaturated carboxylic acid, and optionally a diene rubber. Most preferredly, the polymers of this invention are those produced by polymerizing a major portion of a mono-unsaturated nitrile such as acrylonitrile and a minor portion of the vinyl aromatic monomer such as styrene copolymerizable with said nitrile, in an aqueous medium, preferably in the presence of a preformed diene rubber which may be a homopolymer or a copolymer of a conjugated diene monomer.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl butadiene-1,3, and the like, and others. Most preferred for the purpose of this invention are butadiene and isoprene because of their ready availability and their excellent copolymerization properties.

The olefinically unsaturated nitriles useful in the present invention are the alpha, beta-olefinically unsaturated mononitriles having the structure

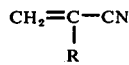

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The vinyl aromatic monomers include styrene, alpha-methyl styrene, the vinyl toluenes, the vinyl xylenes, isopropyl styrene such as o-, m- and p-isopropyl styrene, and the like, and mixures of the same. Most preferred is styrene.

The esters of olefinically unsaturated carboxylic acids include those having the structure

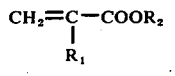

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

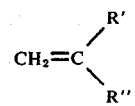

wherein R' and R'' are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

The polymerizates useful in the process of this invention are those prepared by the polymerization of 100 parts by weight of (A) at least 50% by weight of at least one nitrile having the structure

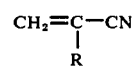

wherein R has the foregoing designation and (B) up to 50% by weight based on the combined weight of (A) and (B) of at least one member selected from the group consisting of (1) an ester having the structure

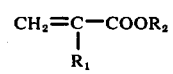

wherein $R_1$ and $R_2$ have the foregoing respective designations (2) an alpha-olefin having the structure

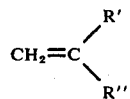

wherein R' and R'' have the foregoing respective designations, (3) a vinyl ether selected from the group consisting of methyl vinyl ether, ethyl vinyl ether, the propyl vinyl ethers, and the butyl vinyl ethers, (4) vinyl acetate, and (5) styrene, in the presence of from 0 to 40 parts by weight of (C) a rubbery polymer of a conjugated diene monomer selected from the group consisting of butadiene and isoprene and optionally a comonomer selected from the group consisting of styrene and a nitrile monomer having the structure

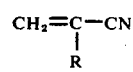

wherein R has the foregoing designation, said rubbery polymer containing from 50 to 100% by weight of polymerized conjugated diene and from 0 to 50% by weight of comonomer.

Preferably, component (A) should be present in amounts from about 70 to 90% by weight based on the combined weight of (A) and (B) and the rubbery polymer (C) should contain more than 50% by weight of conjugated diene and more preferably from 60% to 90% by weight of the conjugated diene. The polymeric compositions of the present invention can be prepared by any of the known general techniques of polymerization including the bulk polymerization, solution polymerization and emulsion or suspension polymerization techniques, by batch, continuous or intermittent addition of the monomers and other components. The polymerization is preferably carried out in aqueous emulsion or suspension processes in the presence of an emulsifier, molecular weight modifier and a free-radical generating polymerization initiator at a temperature of from about 0° to 100°C in the substantial absence of molecular oxygen. It is also preferred that the monomers are copolymerized in the presence of an emulsion or a suspension of the preformed rubber. The product of the aqueous emulsion polymerization is usually a latex. The copolymers may be recovered from the latex by any suitable means such as by coagulation with electrolytes or solvents, by freezing, and the like.

The polymerizates useful in the process of this invention can contain compounding ingredients and additives, pigments, colorants, stabilizers, fillers, etc., as is well known in the art so long as the balance between impact strength, flexural strength, tensile strength, processability, heat distortion temperature, and the like is not affected to such a degree that the article is no longer useful for its intended purpose.

Polymeric products of the present invention are thermoplastic materials which can be thermoformed into a wide variety of useful articles in any of the conventional ways employed with known thermoplastic polymeric materials, such as by extrusion, milling, molding, drawing, blowing, and the like. These polymers have excellent solvent resistance and their impact strength and excellent gas and vapor barrier properties make them especially useful in the packaging industry, as for example, in the manufacture of bottles, film and other types of containers for liquids and solids. With such excellent combination of properties, the copolymers of this invention can be used for many other purposes for which the known thermoplastic resins and thermosetting resins by themselves are entirely unsuited.

The invention described herein can be more readily understood from the following illustrative examples, however, it is not to be construed that the scope of this invention is to be limited by these examples. The amounts of the ingredients utilized in these examples are expressed in parts by weight unless otherwise specified.

EXAMPLE I

A. Preparation of the Elastomer

| Components | Parts by Weight |
| --- | --- |
| P & G soap flakes | 2.0 |
| Demineralized water | 200 |
| Butadiene | 75 |
| Styrene | 25 |
| t-dodecyl mercaptan | 0.7 |

-continued

| Components | Parts by Weight |
| --- | --- |
| Sodium salts of polymerized alkyl naphthalene sulfonic acids (Daxad - 11) | 0.1 |
| Potassium persulfate | 0.15 |

The elastomer was prepared by batch polymerization at 60°C for a reaction period of 12 to 16 hours until a conversion level of 84–88 percent was achieved. 0.02 Parts per hundred parts of monomer (phm) of Dow FG-10 antifoaming agent (polydimethyl siloxane, 50% solution) was added, and the latex was carefully vented of unreacted butadiene, giving an elastomer yield of 29–31% solids content.

B. Preparation of the Graft Copolymer

To the polymerization vessel were added 250 parts per hundred parts monomer (pphm) by weight of water, 1.5 pphm of GAFAC RE-610[1], and 0.2 pphm of citric acid monohydrate. The mixture was stirred until homogeneous and 5.0 pphm (active) elastomer (75-butadiene/25-styrene) prepared in step A was then added. 9.6 pphm of acrylonitrile and 0.4 pphm of styrene were added, and the mixture was heated to 60°C with stirring and nitrogen purge. After the temperature reached 60°C, 0.1 pphm of Vazo 52 (2,2'-azobis-[2,4-dimethylvaleronitrile])initiator was added. Ten minutes after the addition of the initiator a monomer-mercaptan feed mixture of 65.4 pphm of acrylonitrile, 24.6 pphm styrene and 0.4 pphm t-butyl mercaptan was continuously added over a 6-hour period. Additional Vazo 52 in amounts of 0.03 pphm was added 2½ hours and 4½ hours after the monomer-mercaptan addition had begun. After completion of the monomer-mercaptan feed, the polymerization reaction was allowed to continue for an additional 30 minutes at 60°C. At the end of this period a conversion level of 82.0% was reached. The polymer latex was subsequently vacuum stripped for four hours at 60°C under a vacuum of 20 inches of mercury.

[1] A mixture of $R-O-(CH_2CH_2O-)_nPO_3M_2$ and $[R-O-(CH_2CH_2O-)_n]_2PO_2M$ wherein $n$ is a number from 1 to 40, R is an alkyl or alkaryl group and M is hydrogen, ammonia or an alkali metal, produced by General Aniline and Film Corp.

EXAMPLE II

To the polymerization vessel were added 250 parts of water (phm) by weight and 1.5 parts phm of GAFAC RE-610. The mixture was stirred until homogeneous and 9.6 pphm of acrylonitrile and 0.4 pphm of styrene were then added. The mixture was heated to 60°C with stirring and nitrogen purge. After the temperature reached 60°C, 0.1 pphm of Vazo 52 initiator was added. Fifteen minutes later, a monomer mixture of 65.4 pphm acrylonitrile, 24.6 pphm styrene and 1.4 pphm of n-dodecyl mercaptan was added continuously over a 5-hour period. Additional Vazo 52 initiator in amounts of 0.03 pphm were added after 2 hours and 3½ hours of monomer addition time. Following the completion of the monomer-mercaptan feed, the reaction was continued for an additional 30 minutes at 60°C. At the end of this period a conversion level of 76.5% was reached. The latex was then vacuum stripped for 2 hours at 60°C under a vacuum of 20 inches of mercury, and the stripped latex was allowed to cool to room temperature and was withdrawn from the polymerization vessel.

EXAMPLE III

To the polymerization vessel were added 250 pphm of water, 1.5 pphm GAFAC RE-610 and 0.2 pphm citric acid monohydrate. The mixture was stirred until homogeneous and 5.0 pphm of elastomer prepared as in Step A of Example 1 was added. 9.6 pphm of acrylonitrile and 0.4 pphm of styrene were then added, and the mixture was purged with nitrogen while being heated to 60°C. After the reaction temperature was stabilized, 0.1 pphm of Vazo 52 initiator was added. Fifteen minutes later, a mixture of 65.4 pphm acrylonitrile, 24.6 pphm styrene and 0.95 pphm limonene dimercaptan was added over a period of 5 hours and 50 minutes. Vazo 52 initiator (0.03 pphm) was then added after 2½ hours and after 4½ hours of monomer addition time. After completing the addition of the monomer-mercaptan mixture, the reaction was continued for an additional 30 minutes at 60°C. At the end of this period a conversion level of 81% was reached. The latex was then vacuum stripped for 2 hours at 60°C under a vacuum of 18 to 20 inches of mercury. The stripped latex was then cooled to room temperature and was removed from the polymerization vessel.

EXAMPLE IV

To the polymerization vessel was added 225 pphm of water and 1.25 pphm of GAFAC RE-610. The mixture was stirred until homogeneous, and 9.8 pphm acrylonitrile and 0.2 pphm of styrene were added. The mixture was purged with nitrogen and heated until the temperature reached 50°C. After the temperature was stabilized at 50°C, 0.1 pphm Vazo 52 initiator and 0.05 pphm Vazo 64 (2,2'-azobisisobutyronitrile) were added. Thirty minutes after initiation the addition of a mixture of 67.5 pphm acrylonitrile, 22.5 pphm styrene and 0.82 pphm limonene dimercaptan was started. The monomer-mercaptan addition rate for the first hour was 9.0% per hour, and after the first hour the monomer-mercaptan feed rate was increased to 15.2% per hour. The total monomer addition time was 7 hours. The reaction temperature was gradually increased at a rate of approximately 1°C per one-half hour until 4 hours of reaction time had lapsed, at which point the temperature was further increased at a rate of 2°C per ½ hour until the maximum temperature of 68°C was reached. At the end of 7 hours of monomer-mercaptan addition, a conversion level of 80% was attained. The latex was vacuum stripped for 3 hours at 67° under a vacuum of 20 inches of mercury, then cooled to room temperature and removed from the polymerization vessel.

EXAMPLE V

To the reactor vessel were added 250 pphm water, 1.5 pphm of GAFAC RE-610 and 0.2 pphm of citric acid monohydrate. The mixture was stirred until homogeneous, and 4.4 pphm of (active) elastomer prepared as in Example 1 Step A was added. 9.6 pphm of acrylonitrile and 0.4 pphm of styrene were then added. The mixture was then purged with nitrogen and heated to 60°C. After the temperature was stabilized, 0.1 pphm Vazo 52 initiator was added. Following this was added a mixture of 65.4 pphm of acrylonitrile, 24.6 pphm of styrene and 0.55 pphm t-butyl mercaptan over a period of 6 hours. The monomer-mercaptan feed was started 15 minutes after the initiator had been added and was continued over a 5-hour period at a polymerization temperature of 60°C. An additional 0.03 pphm of Vazo 52 was added 2½ and 4½ hours after the monomer-mercaptan addition had begun. At the beginning of the sixth hour of monomer-mercaptan feed, the polymerization temperature was increased to 65°C. After completion of the addition of the monomer-mercaptan feed, the reaction was continued for an additional 30 minutes at 65°C. By the end of the reaction period, the conversion level had reached 81%. The latex was then vacuum stripped for 5 hours and 25 minutes at 65°C under a vacuum of 20 inches of mercury, then cooled to room temperature and removed from the polymerization vessel.

The resins in Examples I to V were subsequently treated by adjusting the pH of the latex of the polymer to the level indicated in the experiments summarized in the tables by the slow addition of dilute (ca 2%) aqueous potassium hydroxide solution utilizing a standardized pH meter to determine the hydroxide ion concentration. Any prefloc formed (usually quite low, 0.25–0.50%) during the operation was filtered off through cheesecloth. The latex was placed in a bottle and agitated in a bottle polymerization bath or in a stirred reactor and agitated for a period of 30 minutes to 4 hours at either room temperature or at 60°C. The treated latex was then coagulated in hot water maintained at about 95°C and containing 3.0 grams of $Al_2(SO_4)_3 \cdot 18H_2O$ per 100 grams of dry resin. The resin was subsequently washed with water and dried either in a fluid bed dryer for 2 hours at an air inlet temperature of 60°C, or in a vacuum oven for at least one day at 48°C. t-Butyl mercaptan content in the latex was determined polarographically before and after caustic treatment, and the n-dodecyl mercaptan and limonene dimercaptan contents were determined by means of coulometric titration.

Physical properties of the resins were measured on molded bars prepared by subjecting the dried resins to a pressure of 4000 psi at a temperature of 190°–210°C for a period of 5 to 10 minutes. The physical properties given in Tables I to VI for the molded test bars prepared from the polymers treated in accordance with the conditions given in these tables were measured by standard ASTM procedures. Heat distortion temperature (HDT, °C) was measured by the test method ASTM D-648; flexural strength and flexural modulus by ASTM D-790; notched Izod impact strength by ASTM D-256; and tensile strength by ASTM D-638.

The color stability of the polymers in Table VI were evaluated by a method based on the use of a Brabender Plasticorder. The method was designed to enable the prediction of the optical properties such as color resulting from processing various resin batches into fabricated articles. It was found that 5 to 7 minute residence time in the Brabender at 200°C was equivalent to the total heat history that the resin would encounter during processing.

The instrument used consisted of a dynamometer, Type PL-U33AA (No. 2162-64), and its accompanying roller style measuring head (No. A-30/S.B.). The roller style measuring head was electrically heated and was equipped with a Rosemont temperature controller. Fifty-gram samples were screened in the Brabender set for a temperature of 210°C and 35 rpm. Four samples, approximately 1.5 g in weight were removed at three-minute intervals from the Brabender for optical measurements. The initial sample was taken 4 minutes after the start of sample loading. Torque values and temperature were also noted at the four-minute mark. Discs having a uniform thickness of 40 mils were prepared for optical measurements by pressing the fused polymer under mild conditions. The conditions selected for the pressing of discs from Brabendered samples did not contribute significantly to measured optical values. The disc was prepared by placing a mold 40 mils thick and 1¼ inches diameter in a press between two parallel mirror-finished, chrome-plated brass platens, 150 inch thick. The platens were heated to 154°C. A 1.5 g sample of the cooled resin removed at the various times from the Brabender was placed in each of the four cavities of the mold or in two cavities diagonally across from one another if only two discs were being processed. The heated plates containing the resin and the mold therebetween were positioned in the press so that the melt samples were pressed between the two highly polished surfaces. Fifteen thousand pounds ram pressure was applied and held for 5 to 10 seconds. The pressure was then released and the entire unit transferred to a cold press where 20,000 lbs. ram pressure was applied. After approximately 30 seconds the plates were sufficiently cool to handle. The unit was then removed and the discs were removed from the cavities. The yellowness index was determined by ASTM Standard Method D 1925-70.

The effect of process variables on the removal of residual mercaptan from rubber-modified resins as well as the base resins containing varying initial concentrations of the mercaptan chain transfer agents are shown by the test data summarized in Tables I through VI.

The data in Table I show the effect of caustic treat on a rubber-modified resin which was prepared using t-butyl mercaptan as a molecular weight modifier and which has been stripped of the major portion of the residual mercaptan and monomer before the pH adjustment was made. The data show that a pH of about 10 is essential for quantitative removal of low levels of unreacted t-butyl mercaptan from the resin, and that the major portion of the residual mercaptan can be removed in about 30 minutes or less even at room temperature (Table II).

Experiments 18, 19 and 20 shown in Table II indicate that there would be no additional advantage in utilizing a pH higher than about 10.5 in the treating process and that a treating time of 30 minutes is effective for essentially quantitative removal of mercaptan from the stripped as well as the unstripped rubber-modified resins. The data in this table also confirm that there appears to be no rate advantage in mercaptan removal at elevated temperatures.

The advantage of applying the present process to resins containing residual mercaptan of higher molecular weight, as exemplified by n-dodecyl mercaptan and limonene dimercaptan, is demonstrated by the experiments summarized in Tables III, IV and V. These data also demonstrate that this process is effective for the removal of residual mercaptan of a higher molecular weight from the base resin (Tables III and IV) as well as from the rubber-modified resin (Table V), at room temperature, and that the physical characteristics of the resins in either case are not adversely affected by the process. The data in Table IV (Experiments 19, 20 and 21) also show that at a pH of 10, under more severe processing conditions such as agitation and elevated temperatures (60°C), a small increase in mercaptan concentration can occur with increased contact time. This increase may be attributed to a decrease in the thermal stability of the limonene dimercaptan-acrylonitrile adduct under more severe treating conditions which results in regeneration of some mercaptan. In most instances, however, this increased mercaptan concentration is not observed under the preferred process conditions.

The improvement in color stability of the resins obtained by the present process is shown by the data given in Table VI. The yellowness index measurements obtained in the Brabender stability test for resins from both stripped and unstripped latices show that less color is developed in the resins treated in accordance with the present process than from the untreated latices for both the unstabilized latices and latices stabilized with di-n-octyl tin maleate polymer[2]. Further, Experiment 3 in this table shows that the latex subjected to the severe conditions of vacuum stripping for 3 hours at 60°C following pH adjustment to 10 had better color than the corresponding untreated, unstripped resin in Experiment 1. This observation lends support to the theory that the cyanoethylated mercaptan formed in the process may have same color stabilizing effect in nitrile resins.

[2]Thermolite 813, M&T Chemicals, Inc.

The adverse effect on resin color of stripping the untreated latex is shown by comparing the resin color in Experiment 1 with that in Experiment 4 for both the unstabilized resin and the resin stabilized with di-n-octyl tin maleate polymer. The yellowness index slopes for the unstripped, unstabilized and stabilized control (pH 3), were 4.09 and 1.02, respectively, compared with yellowness index slopes of 4.50 and 1.18 for the resin derived from latex which had been subjected to stripping before making the pH adjustment.

The physical properties of the treated and untreated resins summarized in Tables IV and VI show that there is virtually no change in the physical properties as determined on the compression molded bars of the treated resin (pH 10) as compared with the untreated control (pH 3).

The thermal stability of the cyanoethylated product, the thio-nitrile, formed in this process was demonstrated by subjecting a resin containing substantial quantities of the cyanoethylated product to treatment in the Brabender Plasticorder for 15 minutes at 230°C. No mercaptan odor was observed as a result of this severe treatment. This is particularly advantageous in a commercial plant operation where the treated resin can subsequently be stripped to remove residual monomers and impurities therefrom without the development of any mercaptan odor or any adverse effects on the properties of the resin.

Table 1

Effect of pH on t-Butyl Mercaptan Content in Direct Graft AN/S Resin[1]

| Ex. No. | Treating Conditions[2] Initial pH | Final pH | Time, Hrs. | t-Butyl Mercaptan, ppm Before | After | HDT°C | Properties of Compression Molded Bars Flex. S., p.s.i.,×10³ | Flex. Mod. p.s.i.,×10⁵ | Notched Izod Ft. lbs/in. notch | Tensile S. p.s.i.,×10³ |
|---|---|---|---|---|---|---|---|---|---|---|
| 1 | — | — | — | 14 | — | — | — | — | — | — |
| 2 | 3.4 | 3.25 | 0.5 | 14 | 6.5 | — | — | — | — | — |

Table 1-continued

Effect of pH on t-Butyl Mercaptan Content in Direct Graft AN/S Resin[1]

| Ex. No. | Treating Conditions[2] Initial pH | Final pH | Time, Hrs. | t-Butyl Mercaptan, ppm Before | After | HDT°C | Properties of Compression Molded Bars Flex. S., p.s.i.,×10³ | Flex. Mod. p.s.i.,×10⁵ | Notched Izod Ft. lbs/in. notch | Tensile S. p.s.i.,×10³ |
|---|---|---|---|---|---|---|---|---|---|---|
| 3 | 3.4 | 3.30 | 2.0 | 14 | 6.7 | — | — | — | — | — |
| 4 | 3.4 | 3.30 | 4.0 | 14 | 11.0 | — | — | — | — | — |
| 5 | 3.4 | 4.85 | 6.0 | 14 | 8.0 | — | — | — | — | — |
| 6 | 8.0 | 7.55 | 0.5 | 14 | 5.7 | — | — | — | — | — |
| 7 | 8.0 | 7.60 | 2.0 | 14 | 6.9 | — | — | — | — | — |
| 8 | 8.0 | 7.55 | 4.0 | 14 | 4.5 | — | — | — | — | — |
| 9 | 9.0 | 8.05 | 0.5 | 14 | 5.0 | — | — | — | — | — |
| 10 | 9.0 | 8.10 | 2.0 | 14 | 3.9 | — | — | — | — | — |
| 11 | 9.0 | 7.95 | 4.0 | 14 | 3.7 | — | — | — | — | — |
| 12 | 10.0 | 8.65 | 0.5 | 14 | 1.0 | 91 | 18.4 | 4.64 | 0.29 | — |
| 13 | 10.0 | 8.65 | 2.0 | 14 | 0.6 | 91 | 18.0 | 4.99 | 0.22 | 12.8 |
| 14 | 10.0 | 8.65 | 4.0 | 14 | 0.1 | 92 | 18.5 | 4.56 | 0.25 | 13.4 |

[1]Resin of Example 1.
[2]Latices placed in bottle polymerization bath maintained at 60°C.

Table II

Effect of pH, Temperature, and Initial Mercaptan Concentration on Mercaptan Removal from Direct Graft AN/S Resins[1]

| Ex. No. | Temp °C[2] | Treating Conditions Time, Hrs. | Initial pH | Final pH | t-Butyl Mercaptan, ppm Before[3] | After | HDT°C | Properties of Compression Molded Bars[4] Flex. S., p.s.i.,×10³ | Flex. Mod. p.s.i.,×10⁵ | Notched Izod Ft. lbs/in. notch | Tensile S. p.s.i.,×10³ |
|---|---|---|---|---|---|---|---|---|---|---|---|
| 1 | R.T. | 0.5 | 3.4 | 3.4 | 110 | 93 | | | | | |
| 2 | R.T. | 2.0 | 3.4 | 3.35 | 110 | 122 | | | | | |
| 3 | R.T. | 4.0 | 3.4 | 3.35 | 110 | 104 | 94 | 10.8 | 4.77 | 0.16 | 7.21 |
| 4 | R.T. | 6.0 | 3.4 | — | 110 | — | | | | | |
| 5 | R.T. | 0.5 | 10 | 9.3 | 110 | <1 | | | | | |
| 6 | R.T. | 2.0 | 10 | 9.55 | 110 | <1 | 94 | 18.5 | 4.78 | 0.35 | 13.3 |
| 7 | R.T. | 4.0 | 10 | 9.55 | 110 | <1 | | | | | |
| 8 | R.T. | 0.5 | 10.5 | 9.95 | 110 | <1 | | | | | |
| 9 | R.T. | 2.0 | 10.5 | 10.1 | 110 | <1 | 92 | 15.4 | 5.01 | 0.15 | 12.9 |
| 10 | R.T. | 4.0 | 10.5 | 10.1 | 110 | <1 | | | | | |
| 11 | 60 | 0.5 | 3.4 | 3.25 | 14 | 16 | | | | | |
| 12 | 60 | 2.0 | 3.4 | 3.25 | 14 | 19 | | | | | |
| 13 | 60 | 4.0 | 3.4 | 3.25 | 14 | 35 | 92 | 18.2 | 5.05 | 0.33 | 13.1 |
| 14 | 60 | 6.0 | 3.4 | 3.25 | 14 | 19 | | | | | |
| 15 | 60 | 0.5 | 10 | 9.5 | 14 | <1 | | | | | |
| 16 | 60 | 2.0 | 10 | 9.5 | 14 | <1 | 93 | 9.7 | 4.98 | 0.16 | 7.8 |
| 17 | 60 | 4.0 | 10 | 9.5 | 14 | <1 | | | | | |
| 18 | 60 | 0.5 | 10.5 | 9.55 | 14 | <1 | | | | | |
| 19 | 60 | 2.0 | 10.5 | 10.1 | 14 | <1 | 92 | 10.4 | 5.15 | 0.31 | 5.12 |
| 20 | 60 | 4.0 | 10.5 | 10.1 | 14 | <1 | | | | | |

[1]Resin of Example 1, unstripped.
[2]R.T. - Room Temperature, Stripped.
[3]R.T. - Room Temperature, 21-23°C
[4]Properties obtained on combined samples.

Table III

Effect of pH and Temperature on Removal of n-Dodecyl Mercaptan from AN/S Base Resin[1]

| Ex. No. | Temp. °C | Treating Conditions Initial pH | Final pH | Time Hrs. | n-Dodecyl Mercaptan, ppm Before | After |
|---|---|---|---|---|---|---|
| 1 | R.T. | 3.2 | 3.1 | 0.5 | 20 | 31 |
| 2 | R.T. | 3.2 | 3.1 | 2.0 | 20 | 33 |
| 3 | R.T. | 3.2 | 3.1 | 4.0 | 20 | 32 |
| 4 | R.T. | 10.0 | 9.3 | 0.5 | 20 | 1.5 |
| 5 | R.T. | 10.0 | 9.3 | 2.0 | 20 | 1.8 |
| 6 | R.T. | 10.0 | 9.3 | 4.0 | 20 | 1.5 |
| 7 | 60 | 3.2 | 3.1 | 0.5 | 20 | 46 |
| 8 | 60 | 3.2 | 3.1 | 2.0 | 20 | 42 |
| 9 | 60 | 3.2 | 3.1 | 4.0 | 20 | 44 |
| 10 | 60 | 3.2 | 3.1 | 6.0 | 20 | 39 |
| 11 | 60 | 10.0 | 8.6 | 0.5 | 20 | 0.9 |
| 12 | 60 | 10.0 | 8.6 | 2.0 | 20 | 0.8 |
| 13 | 60 | 10.0 | 8.6 | 4.0 | 20 | 0.8 |

[1]Resin of Example 2.

Table IV

Effect of pH and Temperature on Limonene Dimercaptan Content in AN/S Latex Base Resin[1]

| Ex. No. | Temp. °C | Treating Conditions Time, Hrs. | Initial pH | Final pH | Limonene Dimercaptan ppm Before | After | HDT°C | Properties of Compression Molded Bars[2] Flex. S., p.s.i.,×10³ | Flex. Mod., p.s.i.,×10⁵ | Notched Izod Ft. lbs/in. notch | Tensile S. p.s.i.,×10³ |
|---|---|---|---|---|---|---|---|---|---|---|---|
| 1 | R.T.[4] | 0.5 | 3.2 | 3.4 | 26 | 24 | | | | | |
| 2 | R.T. | 2.0 | 3.2 | 3.4 | 26 | 26 | 92 | 21.2 | 5.77 | 0.20 | 14.9 |
| 3 | R.T. | 4.0 | 3.2 | 3.4 | 26 | 23 | | | | | |
| 4 | R.T. | 6.0 | 3.2 | 3.4 | 26 | 26 | | | | | |
| 5 | R.T. | 0.5 | 10.0 | 9.25 | 26 | 1.8 | | | | | |
| 6 | R.T. | 2.0 | 10.0 | 9.25 | 26 | 1.0 | 92 | 21.2 | 5.33 | 0.17 | 14.9 |

Table IV-continued

Effect of pH and Temperature on Limonene Dimercaptan Content in AN/S Latex Base Resin[1]

| Ex. No. | Temp. °C | Treating Conditions Time, Hrs. | Initial pH | Final pH | Limonene Dimercaptan ppm Before | After | Properties of Compression Molded Bars[2] HDT°C | Flex. S., p.s.i.,×10³ | Flex. Mod., p.s.i.,×10⁵ | Notched Izod Ft. lbs/in. notch | Tensile S. p.s.i.,×10³ |
|---|---|---|---|---|---|---|---|---|---|---|---|
| 7 | R.T. | 4.0 | 10.0 | 9.25 | 26 | 1.5 | | | | | |
| 8 | R.T.[3] | 0.5 | 3.2 | 3.35 | 26 | 25 | | | | | |
| 9 | R.T. | 2.0 | 3.2 | 3.35 | 26 | 26 | 93 | 20.7 | 5.81 | 0.36 | 18.6 |
| 10 | R.T. | 4.0 | 3.2 | 3.35 | 26 | 23 | | | | | |
| 11 | R.T. | 6.0 | 3.2 | 3.35 | 26 | 24 | | | | | |
| 12 | R.T.[3] | 0.5 | 10.0 | 10.05 | 26 | 0.5 | 94 | 22.4 | 5.82 | 0.24 | 15.8 |
| 13 | R.T. | 2.0 | 10.0 | 9.95 | 26 | 1.7 | | | | | |
| 14 | R.T. | 4.0 | 10.0 | 9.70 | 26 | 0.5 | | | | | |
| 15 | 60 | 0.5 | 3.2 | 3.45 | 26 | 28 | | | | | |
| 16 | 60 | 2.0 | 3.2 | 3.45 | 26 | 24 | 93 | 21.8 | 5.79 | 0.16 | 13.0 |
| 17 | 60 | 4.0 | 3.2 | 3.45 | 26 | 24 | | | | | |
| 18 | 60 | 6.0 | 3.2 | 3.45 | 26 | 24 | | | | | |
| 19 | 60 | 0.5 | 10 | 9.75 | 26 | 1.3 | | | | | |
| 20 | 60 | 2.0 | 10 | 9.20 | 26 | 2.2 | — | 21.2 | 5.70 | 0.21 | 16.0 |
| 21 | 60 | 4.0 | 10 | 8.60 | 26 | 3.5 | | | | | |

[1]Resin of Example 4.
[2]Compression molded bar properties determined on combined examples.
[3]No agitation.
[4]R.T. - Room Temperature 21–23°C.

Table V

Effect of pH and Temperature on Limonene Dimercaptan Content in Direct Graft AN/S Latex[1]

| Ex. No. | Temp. °C | Time, Hrs. | Initial pH | Final pH | Limonene Dimercaptan ppm Before | After | Properties of Compression Molded Bars[2] HDT°C | Flex. S., p.s.i.,×10³ | Flex. Mod., p.s.i.,×10⁵ | Notched Izod Ft. lbs/in. notch | Tensile S., p.s.i.,×10³ |
|---|---|---|---|---|---|---|---|---|---|---|---|
| 1 | R.T. | 0.5 | 3.0 | 3.0 | 48 | 48 | | | | | |
| 2 | R.T. | 2.0 | 3.0 | 3.0 | 48 | 50 | | | | | |
| 3 | R.T. | 4.0 | 3.0 | 3.0 | 48 | 39 | | | | | |
| 4 | R.T. | 6.0 | 3.0 | 3.0 | 48 | 29 | | | | | |
| 5 | R.T. | 0.5 | 10.0 | 9.7 | 48 | 4.3 | | | | | |
| 6 | R.T. | 2.0 | 10.0 | 9.8 | 48 | 4.3 | 9.1 | 8.04 | 4.75 | 0.15 | |
| 7 | R.T. | 4.0 | 10.0 | 9.7 | 48 | 3.5 | | | | | |
| 8 | 60 | 0.5 | 3.0 | 3.05 | 48 | 49 | | | | | |
| 9 | 60 | 2.0 | 3.0 | 3.05 | 48 | 46 | | | | | |
| 10 | 60 | 4.0 | 3.0 | 3.05 | 48 | 46 | | | | | |
| 11 | 60 | 6.0 | 3.0 | 3.05 | 48 | 44 | | | | | |
| 12 | 60 | 0.5 | 10.0 | 8.95 | 48 | 5.4 | | | | | |
| 13 | 60 | 2.0 | 10.0 | 8.90 | 48 | 4.6 | 9.0 | 13.5 | 4.96 | 0.13 | 12.2 |
| 14 | 60 | 4.0 | 10.0 | 8.35 | 48 | 5.7 | | | | | |

[1]Resin of Example 3.
[2]Compression molded bar properties obtained on combined samples.

Table VI

Comparison of AN/S Direct Graft Resin Properties from Stripped and Unstripped Lactices with and without pH Adjustment[1,2]

| Ex. No. | Latex Condition | Initial pH | Final pH | t-Butyl Mercaptan,ppm Before | After | Comments | Time Min. | Yellowness Index | Y.I. Slope | HDT°C | Flex. S., p.s.i. ×10³ | Flex. Mod., p.s.i. ×10⁵ | Notched Izod Ft.lbs/in. notch | Tensile S., p.s.i. ×10³ |
|---|---|---|---|---|---|---|---|---|---|---|---|---|---|---|
| 1 | Unstripped (Control) | 3 | — | 158 | — | Unstabilized | 4 | 10.7 | 4.09 | 94 | 15.6 | 4.97 | 0.27 | 12.7 |
| | | | | | | | 7 | 18.6 | | | | | | |
| | | | | | | | 10 | 34.2 | | | | | | |
| | | | | | | | 13 | 46.4 | | | | | | |
| | " | " | — | " | — | Stabilized[3] | 4 | 11.4 | 1.02 | | | | | |
| | | | | | | | 7 | 14.5 | | | | | | |
| | | | | | | | 10 | 17.6 | | | | | | |
| | | | | | | | 13 | 20.6 | | | | | | |
| 2 | Unstripped | 10 | 10 | 158 | <0.5 | Unstabilized | 4 | 9.8 | 2.87 | 93 | 18.8 | 5.09 | 0.23 | 13.6 |
| | | | | | | | 7 | 16.0 | | | | | | |
| | | | | | | | 10 | 26.7 | | | | | | |
| | | | | | | | 13 | 34.9 | | | | | | |
| | Unstripped | 10 | 10 | 158 | <0.5 | Stabilized[3] | 4 | 10.2 | 1.03 | | | | | |
| | | | | | | | 7 | 12.8 | | | | | | |
| | | | | | | | 10 | 16.9 | | | | | | |
| | | | | | | | 13 | 19.1 | | | | | | |
| 3 | Unstripped (Adjusted to pH10 & then vacuum stripped 3 hours at 60°C) | 10 | 8.65 | 158 | <0.5 | Unstabilized | 4 | 12.5 | 3.30 | 94 | 18.6 | 4.58 | 0.08 | 13.6 |
| | | | | | | | 7 | 18.3 | | | | | | |
| | | | | | | | 10 | 30.6 | | | | | | |
| | | | | | | | 13 | 41.4 | | | | | | |
| | " | " | " | " | " | Stabilized[3] | 4 | 12.7 | 0.91 | | | | | |
| | | | | | | | 7 | 14.6 | | | | | | |

Table VI-continued

Comparison of AN/S Direct Graft Resin Properties from Stripped and Unstripped Lactices with and without pH Adjustment[1,2]

| Ex. No. | Latex Condition | Initial pH | Final pH | t-Butyl Mercaptan,ppm Before | After | Comments | Time Min. | Yellowness Index | Y.I. Slope | HDT°C | Flex. S., p.s.i. ×10³ | Flex. Mod., p.s.i. ×10⁵ | Notched Izod Ft.lbs/in. notch | Tensile S., p.s.i. ×10³ |
|---|---|---|---|---|---|---|---|---|---|---|---|---|---|---|
| 4 | Stripped | 10 | 10 | 1.2 | <0.5 | Unstabilized | 10 | 17.8 | | 94 | 16.5 | 5.2 | 0.31 | 12.8 |
| | | | | | | | 13 | 20.7 | | | | | | |
| | | | | | | | 4 | 11.0 | 4.50 | | | | | |
| | | | | | | | 7 | 19.4 | | | | | | |
| | | | | | | | 10 | 37.3 | | | | | | |
| | | | | | | | 13 | 50.0 | | | | | | |
| | " | " | " | " | " | Stabilized[3] | 4 | 11.4 | | | | | | |
| | | | | | | | 7 | 14.2 | 1.18 | | | | | |
| | | | | | | | 10 | 18.4 | | | | | | |
| | | | | | | | 13 | 21.8 | | | | | | |

[1]Resin of Example 5.
[2]Reaction Condit. - resin stirred for 30 min. at room temp.
[3]Resin contained 0.5 parts by weight, phr of stabilizer, Thermolite 813 (dioctyl tin maleate polymer).
[4]Properties of compression molded bars determined on combined samples.

I claim:
1. A process for the removal of residual t-butyl mercaptan modifier from the latex of a nitrile-containing polymer which contains some unreacted olefinic nitrile monomer wherein said nitrile-containing polymer composition results from the polymerization in an aqueous medium of 100 parts by weight of
   A. from 70 to 90% by weight of at least one member selected from the group consisting of acrylonitrile and methacrylonitrile, and
   B. from 30 to 10% by weight of styrene, and
wherein (A) and (B) are copolymerized in the presence of from 0 to 40 parts by weight of
   C. a rubbery polymer of a conjugated diene monomer selected from the group consisting of butadiene and isoprene and optionally a comonomer selected from the group consisting of styrene, acrylonitrile and methacrylonitrile, said rubbery polymer containing from 50 to 100% by weight of polymerized conjugated diene and from 0 to 50% by weight of comonomer comprising adjusting the pH of the latex to within the range of from about 9 to about 10.5 with an aqueous solution of hydroxide ions of a metal selected from the Groups IA, IB, IIA, and IIB of the Periodic Table at a temperature of from about 20°C to about 60°C for a period of from about 20 to about 60 minutes.

2. The process of claim 1 wherein the hydroxide ion is obtained from the hydroxides of the metals selected from the group consisting of sodium and potassium.

* * * * *